1,496,138

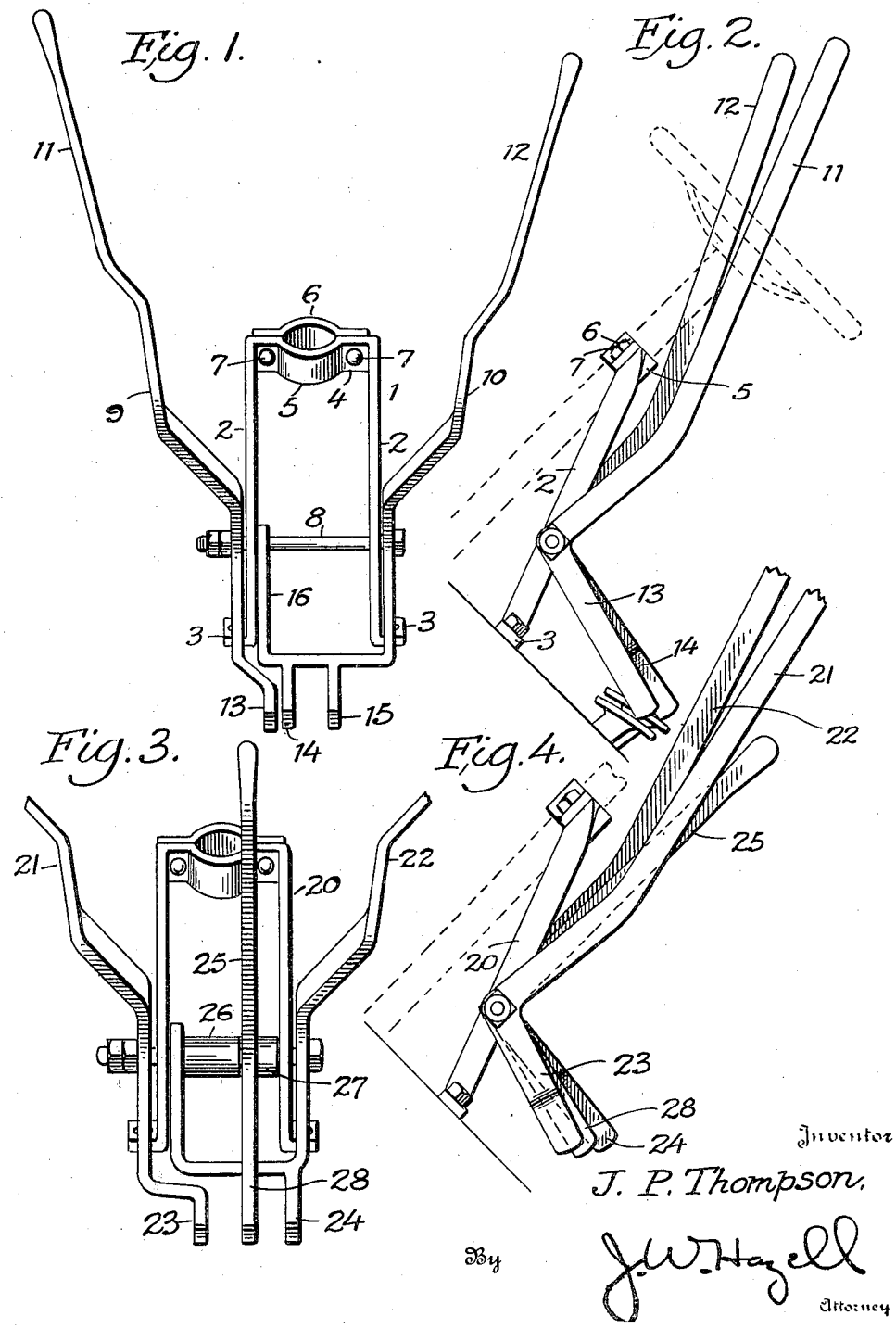
June 3, 1924.
J. P. THOMPSON
1,496,138
HAND OPERATING DEVICE FOR AUTOMOBILES
Filed Oct. 6, 1923
Inventor
J. P. Thompson,
By J. W. Hazell
Attorney Patented June 3, 1924.

UNITED STATES PATENT OFFICE.

JAMES P. THOMPSON, OF ELIZABETH CITY, NORTH CAROLINA.

HAND OPERATING DEVICE FOR AUTOMOBILES.

Application filed October 6, 1923. Serial No. 667,009.

*To all whom it may concern:*

Be it known that I, JAMES P. THOMPSON, a citizen of the United States, residing at Elizabeth City, in the county of Pasquotank and State of North Carolina, have invented certain new and useful Improvements in Hand Operating Devices for Automobiles, of which the following is a specification.

This invention relates to automobiles, and particularly to operating equipment therefor.

One object of the invention is to provide an operating equipment for automobiles which shall enable the operator to drive and control an automobile including shifting the gears, and operating the clutch and brake, entirely by the use of his hands.

Another object of the invention is to provide such a device that can be readily attached to automobiles now in use without necessitating any alterations in their present operating equipment other than simply applying the present invention thereto.

A further object of the invention is to provide such a device which will approach the maximum of simplicity and ease of installation and operation.

Still further objects and advantages of the invention will be apparent from the following description taken in connection with the accompanying drawings which illustrate a preferred embodiment thereof, and in which:

Fig. 1 is an elevation of a preferred embodiment of the invention;

Fig. 2 is a side elevation thereof;

Fig. 3 is an end elevation of an embodiment of the invention particularly designed for the operation of Ford automobiles;

Fig. 4 is a side elevation of the embodiment shown in Fig. 3.

Referring in detail to the accompanying drawings the reference numeral 1 indicates a suitable frame support which may conveniently be of substantial U-shape, consisting of the side bars 2 provided at their lower ends with feet 3 having therein holes adapted to receive suitable securing means which may conveniently be round-head wood screws, though the invention is not limited to this means of attachment. The feet 3 are placed upon the toe-board of an automobile and are attached thereto by means of said round-head wood screws or other suitable attaching means.

The side bars 2 are connected across their tops by a cross piece 4, which is preferably integral with said side bars 2 and cast therewith. The cross piece 4 is suitably bent as shown at 5 to receive and fit around a steering column on an automobile. A clamp member 6, also suitably curved to receive and fit the steering column is removably secured to the cross piece 4 by means of bolts 7 or other suitable means.

By securing the frame support 1 at the bottom to the toe-board of the automobile and at the top to the steering column, there is provided an effective rigid mounting for said frame support.

Passing through the side bars 2 in a substantially horizontal position is the assembly rod 8. Pivotally mounted upon the assembly rod 8 are the operating levers 9 and 10 which are suitably bent as shown in the drawings and provided on their upper ends with hand gripping portions 11 and 12, and at their lower ends with pedal engaging lugs 13, 14 and 15, the lug 13 being provided on the lever 9, and the lugs 14 and 15 being provided on the lever 10. The lower end of the lever 10 may be bent upwardly as shown at 16 to meet the assembly rod 8, and may conveniently be pivoted thereto, for example, within the supporting frame, thereby insuring a greater degree of rigidity.

It will be observed from an inspection of Fig. 1 that the lugs 13 and 14 are relatively close together. Both of these lugs are adapted for engagement with the clutch pedal of an automobile. The lug 15 is adapted for engagement with the brake pedal.

The operation of the device shown in Figs. 1 and 2 is as follows:

When it is desired to throw out the clutch to shift the gears, this is accomplished by the operator by moving the gripping portion of the lever 9 toward him. By this movement the lug 13 presses on the clutch pedal and throws out the clutch. When the gears have been shifted the operator moves the lever 9 away from him, which allows the lug 13 to let in the clutch.

When it is desired to release the clutch and put on the brake to stop the automobile, the operator moves toward him the lever 10. This gives the lugs 14 and 15 a forward movement in which the lug 14 engages the clutch pedal and the lug 15 engages the brake pedal. As these lugs move forward the lug 14 throws out the clutch and the lug 15 puts on the brake, thereby stopping the automobile. A reverse movement of the lever 10 releases the brake and lets in the clutch.

Referring to Figs. 3 and 4, the U-shaped frame 20 may conveniently be the same in construction as the frame shown in Figs. 1 and 2. The levers 21 and 22 pivotally mounted on the assembly rod 8, and are shown as being mounted outside the frame. The levers 21 and 22 are each provided at their lower ends with downwardly extending lugs, the lever 21 having the lug 23 to engage the clutch pedal of a Ford automobile, and the lever 22 having the lug 24 to engage the brake pedal.

Where the invention is to be used to operate Ford automobiles, an additional lever, 25, is mounted on the assembly rod 8, and is held in position thereon, for example, by the spacing sleeves 26 and 27. The lever 25 is provided at its bottom with the pedal engaging portion 28, designed to engage the reversing clutch pedal of a Ford automobile, located between the forward clutch pedal and the brake pedal.

The operation of the construction shown in Figs. 3 and 4 is as follows:

When it is desired to let in the clutch to start the car, the operator pulls the lever 21 toward him, the lug 23 engaging the clutch pedal and moving it forwardly into low gear. When the car has gathered sufficient headway, the operator moves the lever 21 away from him, or allows it to so move, under the action of the clutch pedal, which, when released, will move rearwardly into high gear. The foot brake is controlled by the lever 22, which is moved toward the operator to put on the brake and away from him to release it. When it is desired to stop the car, the lever 21 is moved into neutral position, thus throwing out the clutch, and the lever 22 may be operated to actuate the brake. The reversing clutch is operated by the lever 25, which is moved toward the operator to throw in the clutch and away from him to release it.

It will be seen that the present invention provides a simple rigid construction readily attached to an automobile, and one that will enable the operator to start and stop, let in or throw out the clutch alone, or let out the clutch and put on the brake with a single movement, all by the use of his hands. In the case of a Ford automobile three levers are preferably used, and by operating them as above described the forward and reverse clutches and the foot brake may be readily actuated by the driver entirely by the use of his hands.

What is claimed is:

1. A hand operating device for automobiles comprising a frame support, means for clamping said frame support to the steering column, and securing it to the toe-board of an automobile, a lever pivoted to said frame support on each side thereof, one of said levers having means for engaging the clutch pedal of an automobile, and the other of said levers having means for engaging both clutch and brake pedals.

2. A hand operating device for automobiles comprising a frame support, hand levers pivoted thereon, one of said levers having means for engaging the clutch pedal of an automobile, and the other of said levers having means for engaging both clutch and brake pedals.

3. A hand operating device for automobiles comprising a frame support, means for securing said support to the steering column of an automobile, a hand lever pivoted to said support on each side thereof, one of said levers having a bottom lug for engagement with the clutch pedal of an automobile, and the other of said levers having two bottom lugs for engaging respectively the clutch and brake pedals simultaneously.

4. A hand operating device for automobiles comprising a frame support, means for clamping said support to the steering column of an automobile, a clutch pedal engaging lever and a clutch and brake pedal engaging lever, both of said levers being pivotally associated with said frame support.

5. A hand operating device for automobiles comprising a frame support, means for securing said support to the steering column and toe-board of an automobile, a clutch pedal engaging lever pivotally mounted on one side of said support, and a clutch and brake pedal engaging lever pivotally mounted on the other side of said support.

6. A hand operating device for automobiles, comprising a U-shaped frame support, means for securing said support to the steering column and toe-board of an automobile, a clutch pedal operating lever and a clutch and brake pedal operating lever, both of said levers being pivotally mounted on said support.

7. A hand operating device for automobiles comprising a U-shaped frame support adapted to be clamped to the steering column, and levers pivotally associated therewith, one of said levers having means for actuating the clutch pedal and the other having means for actuating both clutch and brake pedals.

8. A hand operating device for automobiles comprising a frame support, means for securing said support to the toe board of an automobile, means for attaching said support to the steering column of an automobile, and levers pivotally associated with said support intermediate said toe board securing means and said steering column attaching means for actuating the clutch and brake pedals of said automobile.

In testimony whereof I affix my signature.

JAMES P. THOMPSON.